United States Patent [19]

Shibayama et al.

[11] Patent Number: 4,780,035
[45] Date of Patent: Oct. 25, 1988

[54] ROTARY WELDING MEMBER MADE OF RESIN

[75] Inventors: Teruji Shibayama; Yoshio Kaneko, both of Yokohama, Japan

[73] Assignee: Nifco, Inc., Yokohama, Japan

[21] Appl. No.: 76,576

[22] Filed: Jul. 22, 1987

[30] Foreign Application Priority Data

Jul. 23, 1986 [JP] Japan .................. 61-173128

[51] Int. Cl.$^4$ ............................ F16B 37/06
[52] U.S. Cl. ............................ 411/171; 411/82; 411/908; 156/73.5
[58] Field of Search ............ 411/171, 82, 2, 258, 411/908; 156/73.5, 295, 303.1

[56] References Cited

U.S. PATENT DOCUMENTS

| | | | |
|---|---|---|---|
| 2,784,758 | 3/1957 | Rohe | 411/171 |
| 4,301,343 | 11/1981 | Jonelis | 29/622 X |
| 4,430,034 | 2/1984 | Fujikawa | 411/179 |
| 4,551,189 | 11/1985 | Peterson | 411/82 X |
| 4,566,294 | 1/1986 | Hara et al. | 156/73.5 |
| 4,636,124 | 1/1987 | Gugle et al. | 411/82 |
| 4,676,707 | 6/1987 | Cearlock et al. | 411/82 X |

FOREIGN PATENT DOCUMENTS 3501715  7/1986  Fed. Rep. of Germany ..... 156/73.5

*Primary Examiner*—Gary L. Smith
*Assistant Examiner*—Curtis B. Brueske
*Attorney, Agent, or Firm*—Schwartz & Weinrieb

[57] ABSTRACT

A rotary welding member made of synthetic resin material comprising a post portion, and a disk-shaped flange portion integrally mounted on one end of the post portion and having at least one groove in the mounting surface thereof for permitting air to flow therethrough with respect to an exterior periphery surface portion of the flange portion whereby excess frictional heat generated during the rotary welding process is effectively dissipated.

20 Claims, 3 Drawing Sheets

FIG.I
PRIOR ART
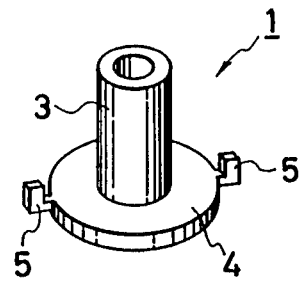
FIG.2
PRIOR ART
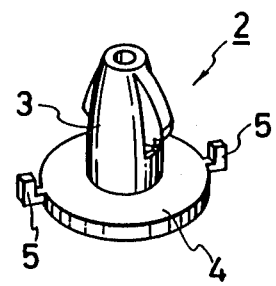
FIG.3
PRIOR ART
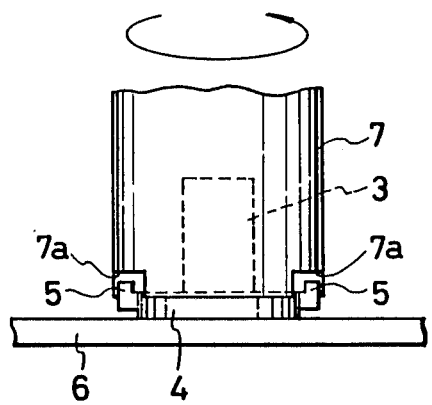
FIG.4(a)
PRIOR ART
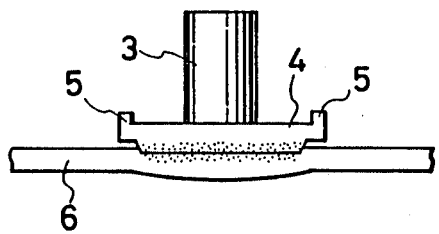
FIG.4(b)
PRIOR ART
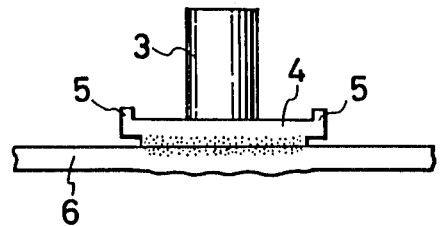

ROTARY WELDING MEMBER MADE OF RESIN

FIELD OF THE INVENTION

This invention relates to a rotary welding member made of a resin material for welding to a synthetic resin surface by frictional heat caused by pressing and rotating the rotary welding member upon and relative to the synthetic resin surface.

BACKGROUND OF THE INVENTION

Various kinds of rotary welding members made of synthetic resin material of the type mentioned above have been proposed (for example, Japanese Patent Publication No. SHO 57-36131, and Japanese Utility Model Public Disclosure Nos. SHO 60-62613 and 60-155654).

A conventional welding member made of resin material for being rotated and welded to a resin surface such as, for example, a stud 1 (FIG. 1) and fastener 2 (FIG. 2) usually has such a structure as that of a post portion 3 with a disk-shaped flange portion 4 mounted upon one end thereof, and the flange portion 4 is provided with engaging projections 5 projecting from the peripheral portion at opposite sides of a welding surface thereof.

In order to mount this member made of resin on a mounting base plate madde of resin, the stud 1 or the fastener 2 is, as is shown in FIG. 3, held and pressed at the desired position on a mounting base plate 6 made of resin by means of a rotary jig 7, and a cut-out section 7a of the rotary jig 7 is engaged with each engaging projection 5 and rotated at a high rate of speed (FIG. 3). Both contacting surfaces of the flange portion 4 and the mounting base plate 6 are melted by means of frictional heat generated at that time. After the rotation has been stopped, the melting portion cools and hardens. As a result, the stud 1 or the fastener 2 is firmly secured to the mounting base plate 6.

However, in the stud 1 or the fastener 2 system of the above-described structure, the contacting surfaces of the flange portion 4 and the mounting base plate 6 are melted by means of frictional heat generated when the rotary welding process is performed. In addition, if the mounting base plate 6 is not thick enough, even the rear surface of the mounting base plate 6 is softened by means of such frictional heat. As a result, as is shown in FIG. 4(a), the rear surface of the mounting base plate 6 is expanded outwardly by means of the pressure of the rotary jig 7 against the stud 1 or the fastener 2 for performance of the welding process, or as is shown in FIG. 4(b), the rear surface of the mounting base plate 6 is warped or wrinkled because of the difference in the coefficient of contraction between the flange portion 4 and the mounting base plate 6 which are melted and welded together and then cool and harden at different rates or to different degrees of amounts, the difference resulting from the difference in the coefficient of linear expansion between the flange portion 4 and the mounting base plate 6. In other words, so-called "set-off" occurs.

Because of the foregoing, in the case where the rear surface of the mounting base plate 6 constitutes an outer surface of a product, the appearance is significantly spoiled by this means of this set-off phenomenon.

OBJECT OF THE INVENTION

An object of the present invention is to provide a rotary welding member made of synthetic resin material, wherein the set-off which often causes degrading of the outer appearance of a product is inhibited.

SUMMARY OF THE INVENTION

In order to achieve the above-mentioned object, in the present invention, a flange portion of a rotary welding member made of synthetic resin material is formed in the mounting surface thereof with at least one groove.

Since the flange portion of the welding member is formed in the mounting surface thereof with the groove, air is drawn in between the mounting surface of the flange portion of the rotary welding member and the mounting base plate during the rotary welding process and therefore excess heat is carried away. For the foregoing reason, excess heat is not transferred to the rear surface of the mounting base plate and the amount of deformation and expansion of the rear surface is reduced. Furthermoree, notwithstanding any difference in the coefficient of linear expansion between the flange portion of the rotary welding member and the mounting base plate, provision of the groove in the flange portion of the rotary welding member permits the flange portion of the rotary welding member to be easily deformed. As a result, since the deformation of the flange portion is easily accomplished by means of the mounting base plate when being hardened and contracted, warping and wrinkling of the outer surface of the mounting base plate is effectively prevented.

BRIEF DESCRIPTION OF THE DRAWINGS

The above and other objects and features of the invention will become more apparent from the following detailed description with reference to the accompanying drawings, wherein:

FIG. 1 is a perspective view showing a stud as one example of a conventional rotary welding member made of resin material;

FIG. 2 is a perspective view showing a fastener as another example of a conventional rotary welding member made of resin material;

FIG. 3 is a schematic view showing a rotary welding operation using the above-mentioned stud;

FIGS. 4(a) and 4(b) are schematic views showing states in which set-off occurs when the welding member is mounted upon the base plate;

DETAILED DESCRIPTION OF THE PREFERRED EMBODIMENTS

Figure 5:
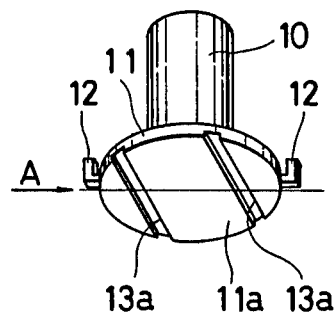
FIG. 5 is a perspective view showing a stud as one example of a rotary welding member made of resin material according to the present invention.

FIG. 5 illustrates a first embodiment of a stud formed as a rotary welding member made of synthetic resin material according to the present invention. In the figure, the welding member is integrally molded of synthetic resin material and comprises a cylindrical post portion 10, a disk-shaped flange portion 11 mounted upon one end of the post portion 10, and a pair of engaging projections 12 located upon the periphery of the flange portion 11 and projecting away from the welding surface. The flange portion 11 is provided within the mounting surface 11a thereof with grooves 13a. In the case where the rotary welding member is formed of a resin material having a high degree of orientation, it is contracted in the direction parallel to the direction of orientation (shown by arrow A) of the resin material when cooled and hardened during the rotary welding process. Accordingly, it is desirable that the grooves 13a be provided so as not to be parallel to the direction of orientation of the resin material. In the stud shown in FIG. 5, the grooves 13a are disposed perpendicular to the direction of orientation. However, in the stud shown in FIG. 6, grooves 13b and 13c are disposed at suitable angles $\theta_1$ and $\theta_2$.

Figure 6:
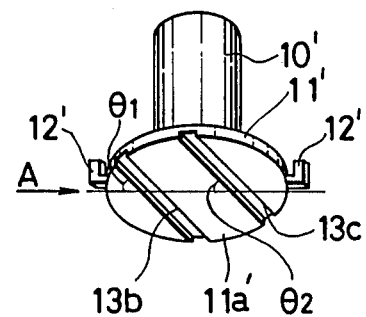
FIG. 6 is a perspective view showing another example of a stud according to the present invention.
Figure 7:
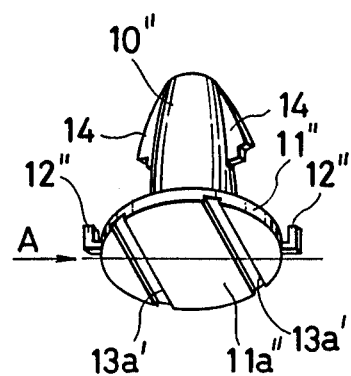
FIG. 7 is a perspective view showing a fastener as one example of the welding member according to the present invention.
Figure 8:
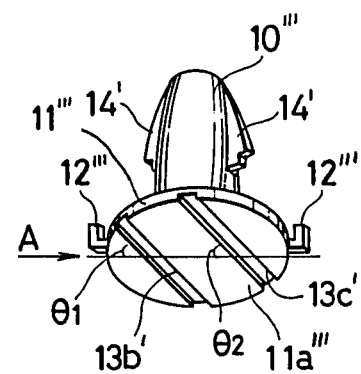
FIG. 8 is a perspective view showing another example of a fastener according to the present invention.

FIGS. 7 and 8 illustrate embodiments of a fastener comprising a post portion 10 like that of the welding member shown in FIGS. 5 and 6, and a pair of elastic projections 14 projecting from an intermediate portion of the post portion 10. The remainder thereof and the arrangement of grooves 13a, 13b, and 13c are the same as those of the embodiments of FIGS. 5 and 6, respectively.

Figure 9:
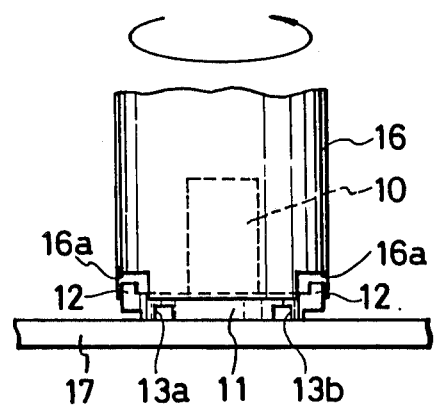
FIG. 9 is a schematic view showing the welding operation using the above-mentioned stud.
Figure 10:
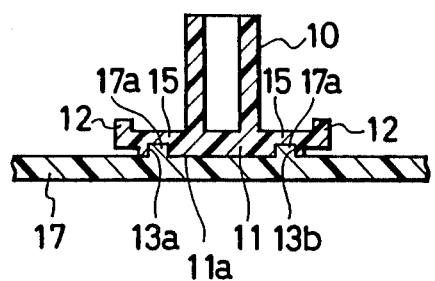
FIG. 10 is a sectional view showing a state in which the welding member is mounted on a base plate.

When, as shown in FIG. 9, these welding members are held with the engaging projections 12 engaged in cut-out sections 16a of a rotary jig 16 with the flange portion 11 thereof pressed against a mounting plate 17 made of synthetic resin material, and are then rotated at a high rate of speed, the contacting surface thereof is melted by means of frictional heat. Then when pressure is applied thereto after stopping the rotation thereof, the flange portion is welded to the mounting base plate 17 (FIG. 10). Since the contacting surface of the flange portion 11 is reduced because of the presence of the aforementioned grooves in the mounting surface 11a of the flange portion 11, the amount of frictional heat generated is reduced. Moreover, since the grooves draw in air during the rotation of the welding member, heat is carried away by the air and therefore an excessive portion of the frictional heat will not remain trapped within the flange portion 11. Accordingly, occurrence of the set-off at the rear surface of the mounting base plate 17 is inhibited and the rear surface of the mounting base plate 17 is not expanded as in the cases with the conventional devices.

Furthermore, in spite of the presence of a difference in the coefficient of linear expansion between the flange portion 11 of the rotary welding member and the mounting base plate 17, since a thin wall portion 15 is formed within the flange portion 11 of the rotary welding member owing to the presence of the grooves of the flange portion 11, the flange portion 11 is readily deformed and the deformation of the flange portion is readily accomplished by means of the mounting base plate 17 when hardened and contracted. Thus, the occurrence of set-off and the generation of warpage and wrinkling on the rear surface of the mounting base plate 17 becomes less.

A resin having a high degree of orientation is contracted in the direction of orientation. However, since the grooves are not disposed in parallel to the direction of orientation, this thin wall portion 15 is readily contracted and deformed.

Furthermore, since the melted portion 17a of the mounting base plate 17 enters the grooves of the flange portion 11 and is hardened therein there during the welding process as is shown in FIG. 10, the flange portion 11 can be more firmly secured to the mounting base plate 17.

The configuration of the grooves of the flange portion 11 are not limited to the ones shown in the above-described embodiments. Instead, they may take any desired configuration.

As described in the foregoing, the rotary welding member made of resin material according to the present invention is constructed in such a manner as to enhance the heat dissipation effect. Accordingly, the occurrence of set-off at the rear surface of the mounting base plate can be reduced.

In addition, since the melted portion of the mounting base plate enters the grooves and is hardened therein, firmer mounting of the rotary welding member upon the mounting base plate can be realized.

Obviously, many modifications and variations of the present invention are possible in light of the above teachings. It is therefore to be understood that within the scope of the appended claims, the present invention may be practiced otherwise than as specifically described herein.

What is claimed is:

1. A rotary welding member integrally molded of synthetic resin material, comprising:
    a post portion;
    a disk-shaped flange portion integrally formed upon one end of said post portion;
    said disk-shaped flange portion having a surface to be friction welded to a substrate as a result of partial melting of said surface of said disk-shaped flange portion in response to heat generated between said surface of said disk-shaped flange portion and said substrate during high-speed rotation of said welding member while in contact with said substrate, and an external peripheral surface circumferentially surrounding said friction welded surface; and
    groove means defined within said friction welded surface of said disk-shaped flange portion and intersecting said peripheral surface of said disk-shaped flange portion so as to be in fluidic communication with said peripheral surface of said disk-shaped flange portion and the ambient atmosphere surrounding said disk-shaped flange portion and thereby permit cooling air to flow through said groove means under said rotary conditions whereby an excessive portion of said generated heat is dissipated so as to prevent deterioration of said substrate.

2. The welding member as claimed in claim 1, wherein the disk-shaped flange portion has at least two grooves.

3. The rotary welding member as claimed in claim 1, wherein:
    said rotary welding member synthetic resin material has a predetermined direction of orientation; and
    said groove means is disposed in a non-parallel relationship with respect to said direction of orientation of said resin.

4. The rotary welding member as claimed in claim 3, wherein:
    said groove means is disposed perpendicular to said direction of orientation of said resin.

5. The rotary welding member as set forth in claim 1, wherein:

said rotary welding member synthetic resin material has a predetermined direction of orientation; and said groove means is disposed at a predetermined angle with respect to said direction of orientation of said resin.

6. The rotary welding member as set forth in claim 1, wherein:

said rotary welding member comprises a stud.

7. The rotary welding member as set forth in claim 1, wherein:

said rotary welding member comprises a fastener.

8. The rotary welding member as set forth in claim 1, further comprising:

projection means mounted upon said disk-shaped flange portion for engaging a rotary tool whereby said high-speed rotation of said rotary welding member is achieved.

9. The rotary welding member as set forth in claim 8, wherein:

said projection means comprises a pair of projections disposed upon diametrically opposite sections of said disk-shaped flange portion.

10. The rotary welding member as set forth in claim 1, wherein:

said groove means comprises linearly extending groove means.

11. The rotary welding member as set forth in claim 10, wherein:

said linearly extending groove means comprises chords intersecting said peripheral surface of said disk-shaped flange portion at two opposed locations.

12. The rotary welding member as set forth in claim 1, wherein:

said groove means comprises a pair of parallel, linearly extending grooves.

13. The rotary welding member as set forth in claim 12, wherein:

said linearly extending groove means comprises chords intersecting said peripheral surface of said disk-shaped flange portion at two, substantially diametrically opposed locations.

14. The rotary welding member as set forth in claim 13, wherein:

said rotary welding member is a stud.

15. The rotary welding member as set forth in claim 13, wherein:

said rotary welding member is a fastener.

16. The rotary welding member as set forth in claim 13, further comprising:

projection means mounted upon said disk-shaped flange portion for engaging a rotary tool whereby said high-speed rotation of said rotary welding member is achieved.

17. The rotary welding member as set forth in claim 16, wherein:

said projection means comprises a pair of projections disposed upon diametrically opposed sections of said disk-shaped flange portion.

18. The rotary welding member as set forth in claim 5, wherein:

said rotary welding member comprises a stud.

19. The rotary welding member as set forth in claim 5, wherein:

said rotary welding member comprises a fastener.

20. The rotary welding member as set forth in claim 2, wherein:

each of said two grooves extends linearly across said disk-shaped flange portion so as to define chords intersecting said peripheral surface of said disk-shaped flange portion at two, substantially diametrically opposed locations.

* * * * *